United States Patent Office 3,002,772
Patented Oct. 3, 1961

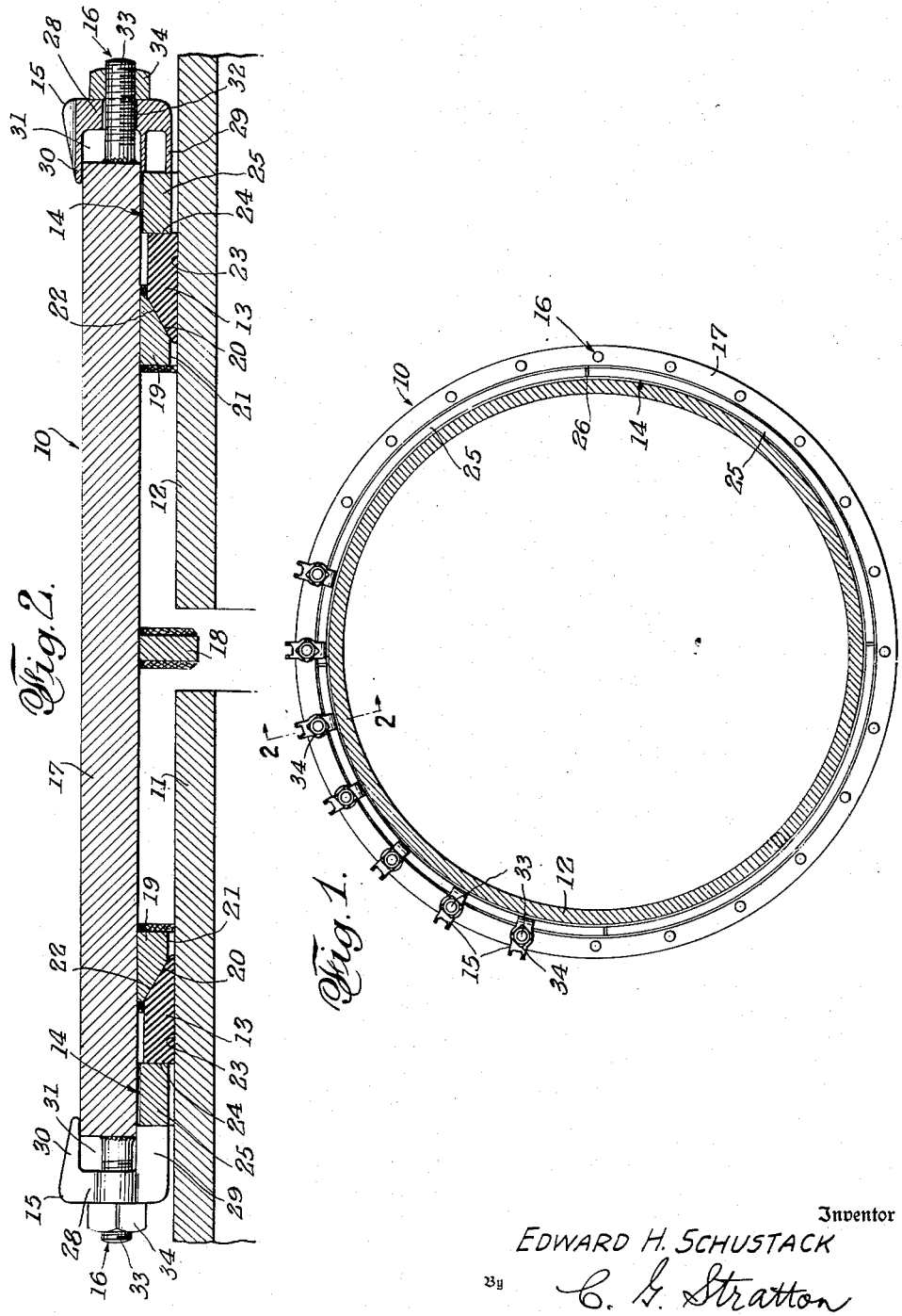

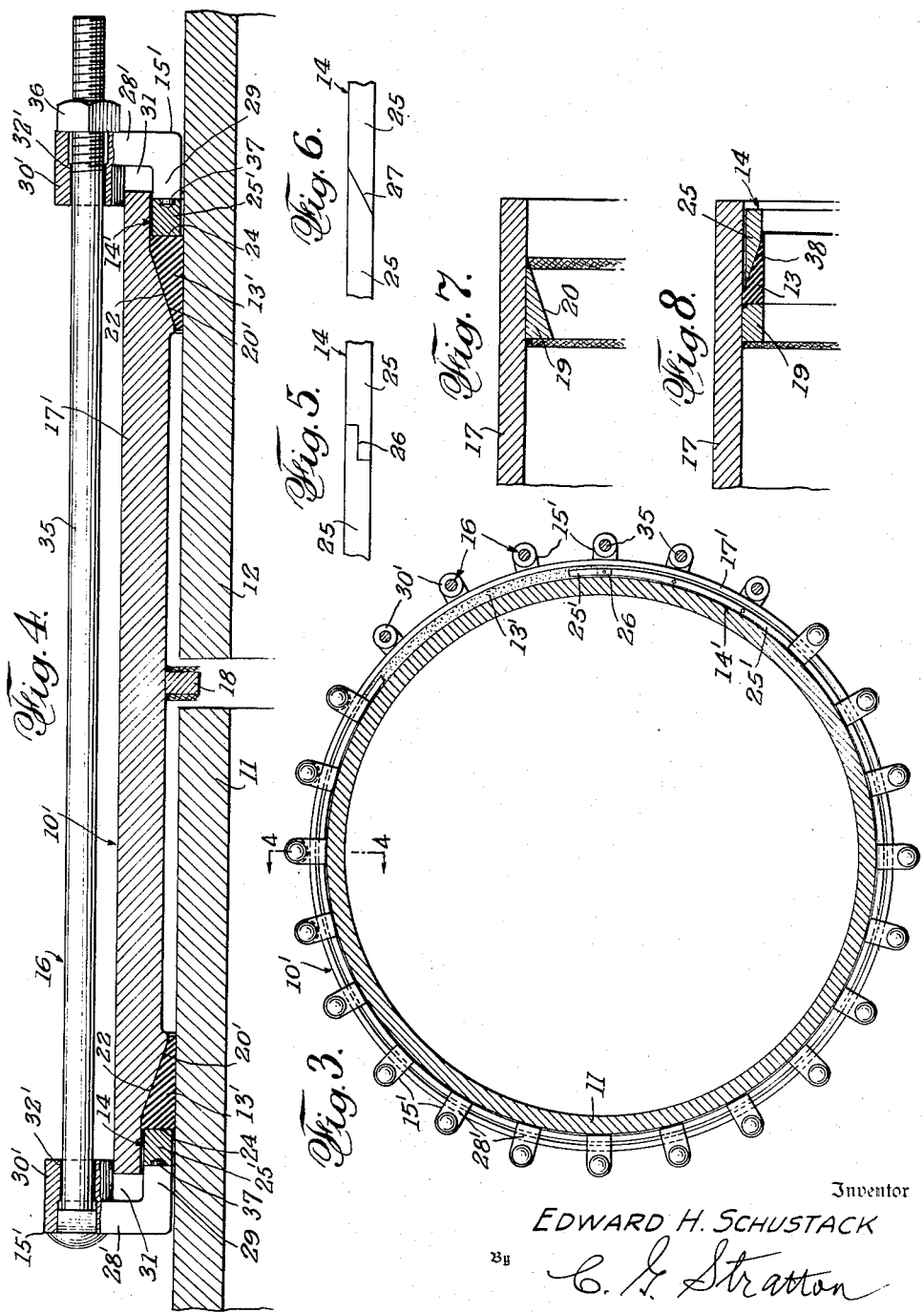

3,002,772
COUPLING WITH GASKET COMPRESSED BY MEANS EXERTING PRESSURE PARALLEL TO AXIS
Edward H. Schustack, 1816 N. Stanley, Los Angeles, Calif.
Continuation of application Ser. No. 394,915, Nov. 30, 1953. This application Jan. 29, 1959, Ser. No. 797,323
4 Claims. (Cl. 285—342)

This invention relates to couplings for pipes, particularly of large diameter. Penstocks, ten to twenty feet or more in diameter, are large-diameter pipes of the nature contemplated to be connected by the present coupling construction.

One conventional coupling for pipes of large diameter comprises a multiplicity of arcuate sections that are assembled and bolted together around the adjacent ends of two pipes with intervening seals or gaskets. Such a construction has many longitudinal seams which, because of normal expansion and contraction in the joint thus formed, are subject to leakage at such seams and, therefore, require continual inspection and take-up to insure against leakage. Moreover, assembly is more difficult, particularly in close quarters. Another drawback is that the sealing means are usually unevenly compressed as the sections are assembled.

An object of the present invention is to provide a coupling for large diameter pipes in which the above-enumerated faults are absent, the invention contemplating an integral tubular outer coupling sleeve against inner flanges of which gasket seals are compressed by novel and easily end-applied means to effect proper sealing engagement around the adjacent ends of two pipes being coupled. Since unevenly compressed sealing means cause leaks, the present means contemplates sealing engagement that is evenly compressed to obviate such leakage.

Another object of the invention is to provide an integral outer sleeve coupling in which individual end-pressure-applying lug elements are drawn toward each other from opposite ends of the coupling to mutually interact with the sealing means against which these lugs apply their pressure, to produce a proper seal around the adjacent ends of two pipes. By the provision of individual or separate lugs, accidental slack-off of some of them will not materially affect the efficiency of the seal, particularly, as contemplated, by interposing a substantially rigid pressure member between the seal at each end and the pressure-applying lug elements. It is to be borne in mind that the present coupling is devised for use on penstocks and similar large-diameter pipes and that such pipes, while ordinarily made of rigid material, are, in fact, flexible not only longitudinally but also in the plane perpendicular to their length. Although the pressure member contemplated is, in fact, made of rigid material and is stiff in the sense that the same transmits the pressure of the lug elements circumferentially between said elements, nevertheless, this substantially rigid pressure member has flexibility comparable to that of large diameter pipes—flexibility that produces conformation circumferentially as well as accommodation to the pressure imposed by the individual lugs.

A further object of the invention is to provide a coupling, as above indicated, in which the integral outer sleeve constitutes the member that is placed in tension by the application of the pressure of the lug elements on the sealing gaskets. In this manner, slack-off of any lug element at one end of the coupling does not affect a lug element at the opposite end.

A still further object of the invention is to provide a coupling in which longitudinally spanning bolts are placed in tension by the lug elements as they apply their pressure.

A still further object of the invention is to provide a novel cooperation between the lug elements and the ends of the outer coupling sleeve to guide the former against any turning movement during application of pressure.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes, preferred embodiments of the present invention, which are given by way of illustration of example only.

In the drawings, like reference characters designate similar parts in the several views.

FIG. 1 is an end view, with one of the pipes being coupled in cross-section, of a pipe coupling according to the present invention, some of the lug elements being omitted as being merely repetitious.

FIG. 2 is an enlarged longitudinal sectional view as taken on line 2—2 of FIG. 1.

FIGS. 3 and 4 are views, respectively similar to FIGS. 1 and 2, of an alternate form of coupling.

FIGS. 5 and 6 are fragmentary side views of two different joints provided in pressure rings used in the coupling.

FIGS. 7 and 8 are fragmentary sectional views of further modifications.

The different forms of pipe coupling illustrated each comprise, generally, an outer coupling sleeve or tube 10 that spans across the gap between the adjacent ends of two pipes 11 and 12, sealing gaskets 13 adjacent the ends of sleeve 10 and disposed in the annulus provided between said tube and said pipes, a pressure ring 14 applied against the outer face of each said gasket 13, a multiplicity of lug elements 15 engaged with the outer face of each said pressure ring, and means 16 to press said lug elements in a direction to force the pressure rings against said gaskets.

With particular reference to FIGS. 1 and 2, the outer sleeve 10 is shown as a tubular member 17 having inner and outer parallel walls so that the sleeve has a uniform cross-section. Midway of its ends, the interior of said sleeve is provided with means to limit the degree of intrusion of the ends of pipes 11 and 12. Such means may compose internally directed plates 18 welded in place to form abutment for said pipe ends. In practice, however, said pipe ends are spaced from said plates 18, as shown, to permit length expansion of the pipes under varying temperature conditions.

Adjacent to and spaced from the ends of tube 17, the inner face thereof is provided with anchor rings 19 that reside in the annular space between said tube 17 and the pipes 11 and 12 and are welded in place, as shown, to constitute inwardly projecting annular flanges. The inner faces of said rings are clear of said pipes. The outwardly directed face of each ring 19 is beveled or chamfered from its larger diameter inwardly to constitute a sloping annular face 20. In FIG. 2, said face extends for but part of the width of each ring 19 to leave an inner annular face 21, while in the modification of FIG. 7, said face 20 extends for the entire width of ring 19.

Each gasket 13, made of a suitable elastic compound, such as natural or synthetic rubber, is provided with a beveled or chamfered edge 22 on a slope to fit the ring edges 20 so that, when pressed inwardly, the annular faces 23 of the gasket are firmly pressed by faces 20 against pipes 11 and 12. The outer edge 24 of each gasket 13 is preferably normal to faces 23. Said gaskets may have a triangular cross-section bounded by faces 22, 23 and 24 or, as shown, have a trapezoidal form.

Each pressure ring 14 is preferably formed of a plurality of arcuate segment sections 25 to facilitate assembly thereof around the pipes and into the annular space between said pipes and tube 17 longitudinally outward of the anchor rings and inward of the ends of sleeve 17, or as an integral annulus or ring. As shown in FIG. 5, the ends of said sections 25 may be half-lapped as at 26 or, as shown in FIG. 6, meet at a bevel 27. In any case, it is preferred to overlap the ends of said sections to provide the ring with continuity so that pressure against the end of one segment is transmitted by said end to the end of an adjacent segment overlapping the same.

The lug elements 15 are arranged in spaced relation to bear against the outer faces of pressure ring 14. As best seen in FIG. 2, each lug element is provided with a web or base portion 28 that integrally connects leg portions 29 and 30. Thus, each lug is generally U-shaped. Leg 29 is directed to bear against pressure ring 14 and the space or bifurcation 31 between the legs is such that leg 30 is disposed over and in overlapping engagement with the outer diametral face of sleeve tube 17. It will be seen also that said bifurcated element is designed to have a sliding fit over the end of tube 17. The base or web 28 of each lug element is provided with a hole 32, as best seen at the right end of FIG. 2. The cavity in the end of leg 29 of the lug element 15 that is shown in section in FIG. 2 as well as the top groove in the leg 30 are provided for lightening the lugs without loss of strength.

The means 16 is shown as a multiplicity of threaded studs 33 that are welded to the end faces of sleeve tube 17 so the studs extend outwardly in mutual parallel relation, as shown, and a nut 34 on each stud.

By placing the lug elements 15 on said studs 33, which extend freely through the holes 32 in said lugs, and drawing up on nuts 34, the legs 29 of said lugs bear against the pressure rings to squeeze the gaskets 13 into tight sealing between pipes 11 and 12 and the faces 20 of anchor rings 19. Since the bolts are radially outward of these points of application of pressure, the same will have a turning moment which is counteracted by the mentioned overlap of lug legs 30 and sleeve tube 17. In this way, bending moment on the bolts is obviated.

The bolts 33 are preferably uniformly spaced, as shown in FIG. 1, but the bolts on one end of the coupling need not necessarily be aligned with those on the other end, thereby greatly facilitating their assembly and the welding operation and reducing the cost of manufacture. For that matter, the bolts at one end may be different in number from those at the other end, since they apply their force through the medium of a solid tube and, except for said tube, are independent of each other. It will be noted also that the pressure of the lugs places tube 17 in tension which, because of its substantial mass, resists elongation that may result from such tension. Further, because the lugs on one end are independent of those on the other end, loosening of any lug will not affect the lug directly opposite and, thereby, insure a tight seal even if some of the lugs, for one reason or another, slack off.

In the form of coupling shown in FIGS. 3 and 4, the anchor rings are shown as formed integrally with tube 17', with sloping faces 20' comparable to those above described. In other respects, gaskets 13' and pressure rings 14' are similar to the comparable means described. However, lugs 15' are somewhat differently designed so that legs 30', rather than the base or web 28', are provided with the holes 32', and headed and elongated high tension steel bolts 35 replace the studs 33 and extend through said holes and along the outside of coupling sleeve 10'. Carriage bolts are used to resist turning thereof when nuts 36 are tightened to draw the lugs on opposite ends toward each other, in pairs, to apply pressure on the pressure ring. The lugs 15', in this form, have the same turning moment-resisting engagement with the sleeve tube 17'. Also, to insure substantial alignment of the lugs at the opposite ends, the same may be piloted in pressure rings 14' by means of suitably spaced pin and socket means 37.

The modification of FIG. 8 shows a variation in which the slopes of faces 22 of the gaskets 13 are reversed, i.e., directed outwardly, and the pressure rings provided with complementary sloping faces 38 that force the thinner portions of the gaskets against pipes 11 and 12. In such case, anchor rings 19 are formed to comprise abutments that limit the inward position of the gaskets.

From the foregoing, it will be seen that a strong, yet light-weight, coupling has been provided that enables application of uniform pressure on the gaskets by means of the substantially rigid but optionally segmental pressure rings. Also, if there is material out-of-roundness of pipes 11 and 12, they can be readily inserted into coupling sleeve 10 up to the pressure rings because of the substantial difference in size of the pipes 11 and 12 and the internal diameter of tube 17. In any case, the pressure ring segments may be used to force said pipes into a more true roundness by first inserting one end of a segment between said tube and pipes and progressively forcing, by sidewise tapping, the remainder of the segments into the tube. This causes greater conformity between the tube and pipes and, finally, when the entire pressure ring has thus been forced into place, the tube and pipe will conform regardless whether or not they are truly round. It will be clear from FIG. 4 that such conformation of pipe and sleeve causes a similar conformation of pressure ring 25' because the latter is interposed between said pipe and sleeve. It is evident, therefore, that although the ring 25 is substantially rigid for the purpose of transmitting gasket pressure between adjacent lug elements 15 or transmitting such pressure to the portions of the gasket behind loosened lug elements, the ring, because of its large size, is indeed flexible for pipe and ring conforming purposes.

It will be noted from FIG. 2 that the legs 29 of the individual lug elements 15 apply the force created by the means 16 in a longitudinal direction directly against the outer faces of the pressure rings 25 and in line with the gaskets. Since the lug elements, as explained, are kept from turning by their mentioned engagement with the outer face of sleeve 10, the mentioned application of pressure on the rings is, not only longitudinal, but also non-rotative. Thus, the non-turning pressure of the lug elements together with the direct and non-turning pressure on the rings, produce straight, longitudinal pressure on the outer faces of the gaskets 13. It will also be noted that said legs 29 of the lugs extend partly into the annular spaces between the sleeve and the pipes 11 and 12 that are occupied by the pressure rings 25. The same is true in connection with the structure of FIGS. 3 and 4.

While I have illustrated and described what I now contemplate to be the best modes of carrying out my invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

This application is a continuation of my pending application Serial No. 394,915, filed November 30, 1953, and bearing the same title.

Having thus described the invention, what I claim and desire to be secured by Letters Patent is:

1. In a pipe coupling having an outer sleeve having substantially parallel axially extending inner and outer surfaces surrounding and loosely engaged over the adjacent end of a pipe and provided adjacent to and inwardly spaced from its end on its inner surface with an outwardly flaring conical seat, there being a gasket around said pipe and engaging said seat and a substantially rigid and annular follower ring within said outer sleeve, the improvement that comprises a plurality of relatively narrow, circumferentially spaced lug elements arranged around the end sleeve, each element having a portion disposed in spaced relation beyond the respective end of the sleeve, an extension on the outward end of each said portion and directed over and into sliding engagement with the adjacent outer face of the sleeve, each lug element being provided with a pressure extension on the inward end of each said portion, the latter extension extending partly into the annular space inward of the sleeve end and substantially engaging said inner surface and being in abutting engagement with said follower ring, and bolt means extending through each lug element to draw the elements axially of said sleeve, at least one of said extensions of each element engaging a said surface of said outer sleeve on opposite sides, circumferentially, of said bolt means to prevent turning about an axis parallel to the axis of said coupling, and produce pressure on the follower ring and gasket by the pressure extensions of the lug elements, each said bolt means extending through said element radially between said extensions to prevent turning about an axis perpendicular to the axis of said coupling.

2. In a pipe coupling having an outer sleeve having substantially parallel axially extending inner and outer surfaces surrounding and loosely engaged over the adjacent end of a pipe and provided adjacent to and inwardly spaced from its end on its inner surface with an outwardly flaring conical seat, there being a gasket around said pipe and engaging said seat and a substantially rigid and annular follower ring within said outer sleeve, the improvement that comprises a plurality of relatively narrow, circumferentially spaced lug elements arranged around the end sleeve, each element having a portion disposed in spaced relation beyond the respective end of the sleeve, an extension on the outward end of each said portion and directed over and into sliding engagement with the adjacent outer face of the sleeve, each lug element being provided with a pressure extension on the inward end of each said portion, the latter extension extending partly into the annular space inward of the sleeve end and substantially engaging said inner surface and being in abutting engagement with said follower ring, and bolt means extending through each lug element to draw the elements axially of said sleeve, at least one of said extensions of each element engaging a said surface of said outer sleeve on opposite sides, circumferentially, of said bolt means to prevent turning about an axis parallel to the axis of said coupling and produce pressure on the follower ring and gasket by the pressure extensions of the lug elements, each said bolt means extending through said element radially adjacent said outer extension to minimize turning movement on said element about an axis perpendicular to the axis of said coupling.

3. In a pipe coupling according to claim 1, the further improvement that comprises dividing the pressure ring into a plurality of segments of rigid material.

4. In a pipe coupling according to claim 1, the further improvement that comprises interfitting portions on the pressure extensions of the lug elements and the ring to hold the lug elements against radial outward displacement.

References Cited in the file of this patent
UNITED STATES PATENTS

| | | |
|---|---|---|
| 1,006,490 | Lord | Oct. 24, 1911 |
| 1,479,650 | Clark | Jan. 1, 1924 |
| 1,873,620 | Moore | Aug. 23, 1932 |
| 2,009,744 | Pfefferle | July 30, 1935 |
| 2,059,573 | Gavin | Nov. 3, 1936 |
| 2,087,752 | Carson | July 20, 1937 |
| 2,701,731 | Risley | Feb. 8, 1955 |

FOREIGN PATENTS

| | | |
|---|---|---|
| 430,527 | Great Britain | June 20, 1935 |
| 512,406 | Great Britain | Sept. 1, 1939 |